Figure 2:
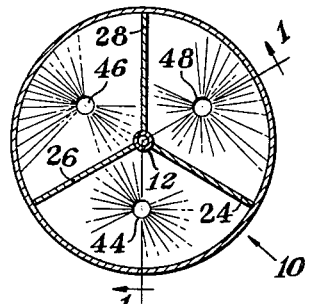

Jan. 5, 1965

C. A. CLARK 3,164,376

BLENDING APPARATUS

Filed March 14, 1963

INVENTOR.
Claude A. Clark
BY Earl D. Ayers
AGENT

United States Patent Office 3,164,376
Patented Jan. 5, 1965

3,164,376
BLENDING APPARATUS
Claude A. Clark, Houston, Tex., assignor to The Dow Chemical Company, Midland, Mich., a corporation of Delaware
Filed Mar. 14, 1963, Ser. No. 265,244
15 Claims. (Cl. 259—4)

This invention relates to blending apparatus and particularly to dry product blenders in which the material to be blended may be transported in a stream of gas.

Many applications exist where it is desirable and/or necessary to blend together more than one type, color, or grade of material to produce a composite blend which has predetermined characteristics.

For example, various types of wheat may, when blended and milled, result in a flour which has characteristics which are unique or are more desirable than those of flour made from any one variety of wheat.

Another example of blending which is often done is to blend granular materials of various grades or colors to form a composite mass of granules which have desirable characteristics.

Although some blenders are available for blending free flowing materials many of these are either expensive to purchase, maintain, and/or operate, or do a less than adequate blending job.

Accordingly, a principal object of this invention is to provide an improved blender for free flowing particulate materials.

Another object of this invention is to provide an improved dry product blender which is capable of blending materials at a rapid rate.

A further object of this invention is to provide an improved dry product blender for particulate materials which is simple to construct and to operate.

In accordance with this invention, there is provided a chamber having generally symmetrically disposed vertical partitions therein which divide the chamber into a plurality of compartments.

Means are provided for withdrawing particulate material in metered amounts or proportions from the bottom part of the compartments, gravity flowing the so withdrawn material into a common conduit, and pneumatically transporting the material through said conduit generally along the longitudinal axis of the chamber to the upper part of the chamber where it is directed against a distribution surface from which the material is dispersed in random manner into the compartments of the chamber.

The material is re-circulated and dispersed until the product mix in each compartment is more or less identical.

Usually the chamber is initially filled by feeding the particulate material into the top of the chamber and onto a dispersing plate or by other means causing the particulate material to pass into the various compartments.

The invention, as well as additional objects and advantages thereof, will be best understood when the following detailed description is read in connection with the accompanying drawings, in which:

FIG. 1 is a side elevational view, partly broken away and in section, of blending apparatus in accordance with this invention;

FIG. 2 is a sectional view taken along the line 2—2 of FIG. 1;

FIG. 3 is an alternative sectional view taken as along the line 3—3 of the top assembly for use with the apparatus of FIG. 1;

FIG. 4 is a fragmentary elevational view, partly in section, of an alternative granular product dispersing device for use in accordance with this invention;

FIG. 5 is a fragmentary sectional view of an alternative embodiment of this invention shown as if it were taken along the line 5—5 of FIG. 1; and FIG. 6 is a sectional view taken along the line 6—6 of FIG. 5.

Referring to the drawing and particularly to FIGS. 1 and 2, there is shown an elongated vertically disposed hollow chamber, indicated generally by the numeral 10, which is, except at its upper end part 12 and lower end part 14, generally tubular in shape and symmetrically disposed around its longitudinal axis.

A hollow pipe-like member 16 extends upwardly through the chamber 10 from below the lower end part 14. The member 16 is coaxial with the longitudinal axis of the chamber 10 and extends, usually, about three quarters of the distance towards the upper end part of the chamber.

The lower end part 14 of the chamber 10 has three hoppers 18, 20, 22 extending downwardly therefrom. The upper or top end part 12 of the chamber is a more or less conventional closure, e.g. a more or less conical member (wide base as compared to the height of the closure member).

Partitions 24, 26, 28 extend from the pipe-like member 16 to the side wall of the chamber 10 and to the side walls of the hoppers 18, 20, 22. As may be seen more clearly in FIG. 2, the partitions are symmetrically disposed with respect to and parallel to the longitudinal axis of the chamber. The upper end of the partitions usually, but not necessarily, extends at least near to the upper end of the pipe-like member 16. The partitions 24, 26, 28 form three compartments within the chamber.

A dispersing member 30 having the form of a pair of cones joined base-to-base is supported by brackets 32. The brackets 32, which extend between the member 30 and the walls of the chamber 10, hold the dispersing member 32 above the upper end of the pipe-like member 16 with the apices of the dispersing member 30 being substantially aligned with respect to the longitudinal axis of the pipe-like member 16. The diameter of the bases of the cones (the central part of the member 30) is substantially larger than the diameter of the member 16. A product fill line 34, substantially smaller in diameter than the diameter of the dispersing member 30, extends through the upper end part 12 in alignment with the longitudinal axis of the dispersing element 30.

The upper end part 12 also has at least one vent 36 and an air exhaust filter 38 coupled thereto and communicating with the interior of the chamber.

Each of the hopper sections 18, 20, 22 at the lower end of the chamber discharges into an individual conduit or line. Lines 40, 42, coupled to the hoppers 18, 22, respectively, are shown. The discharge line from the hopper 20 lies behind the pipe-like member 16 and cannot be seen. However, in FIG. 2, the bores 44, 46, 48, to which the individual discharge lines are coupled, may be seen. Each of the discharge lines has a pressure isolating valve such as the star feeder valve 50, 52, 54, the valves 50, 52 being disposed along and coupled to lines 40, 42, respectively, and the valve 54 being disposed along and coupled to the discharge line (not visible in FIG. 1) from the hopper 20.

Each of the discharge lines is coupled to the pipe-like member 16, the lines intersecting the member 16 at an angle of about 45 degrees with respect to the longitudinal axis of the member 16, each being separated radially from the other by an angle of about 120 degrees. The discharge lines each intersect the member 16 at about the same point along its length.

The pipe-like member 16 is of substantially the same diameter above and below the point along its length where the discharge lines (40, 42 and the line behind member 16) intersect it. The part of the member 16 which lies below the intersection of the lines from the feeder valves 50, 52, 54 is coupled through the line 58 and flap gate valve 57 to a blower 60. The blower 60 has its intake coupled through the line 62 to the air filter 64. In addition, the part of the member 16 which lies below the inlet from the product feeder lines is coupled through the line 66 and valve 68 to a pneumatic conveying line 70.

In operation the particulated material to be blended is fed into the top of the chamber 10 through the product fill line 34, impinges on the upper conical surface of the dispersing element 30 and is randomly distributed into the compartments formed by the partitions 24, 26, 28. Normally, the motor driven star feeder valves 50, 52 and 54 are not operated while the chamber is being filled with particulated material.

When the materials in the compartments of the chamber 10 are to be blended, the flap gate valve 57 is opened, the valve 68 is closed and the blower 60 is operated to force a stream of air through the line 58 and up through the member 16. The star feeder valves 50, 52 and 54 in the various discharge lines are then operated (preferably to permit a balanced or predetermined rate of flow through each valve), permitting particulated material to enter the pipe-like member 16. The upwardly directed air flow through the member 16 is adjusted to exceed the falling rate of the particulated material, thereby carrying particulated material from the three discharge lines up through the member 16 with sufficient velocity to cause them to impinge on the lower conical surface of the dispersing element 30 and be dispersed in a random manner into the compartments in the chamber. Circulation of the particulated materials is continued until the proper blending of the contents of the chamber is accomplished. Usually viewing parts (not shown) are provided in the various hopper discharge lines in order that the appearance of the blend in each discharge line may be observed.

When blended material is to be discharged from the chamber, the blower 60 is shut off, the flap gate valve 57 closed, and the star valve 68 operated (along with the star feeder valves 50, 52 and 54) to convey particulated material into the conveying line 70.

Figure 3:
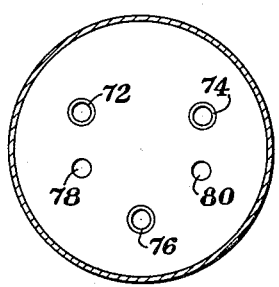

An alternative arrangement of product fill lines 72, 74, 76 is shown in FIG. 3. Instead of a single fill line (34 in FIG. 1), three fill lines are used, one fill line supplying particulated material to each of the three compartments in the chamber 10. The fill lines 72, 74, 76 may be fed from a common line or from separate lines. This arrangement, when each fill line is fed from a different source, results in the blended material becoming substantially uniform in a shorter time because there is less stratification of material in a uniform manner in the compartments of the blender as they are filled. Vent lines 78, 80 are provided.

Figure 4:
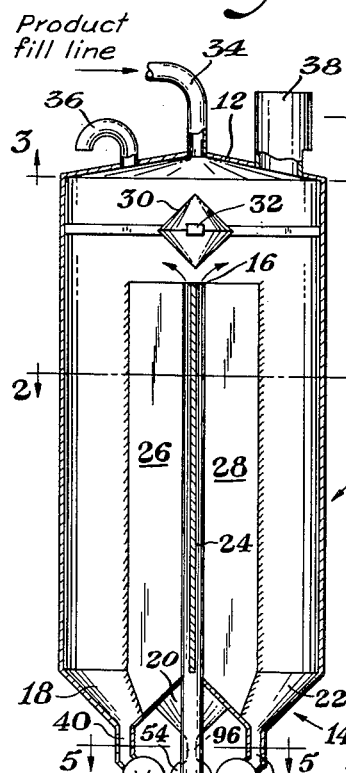
Figure 4:
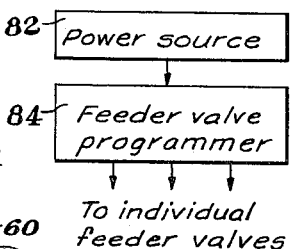
Figure 1:
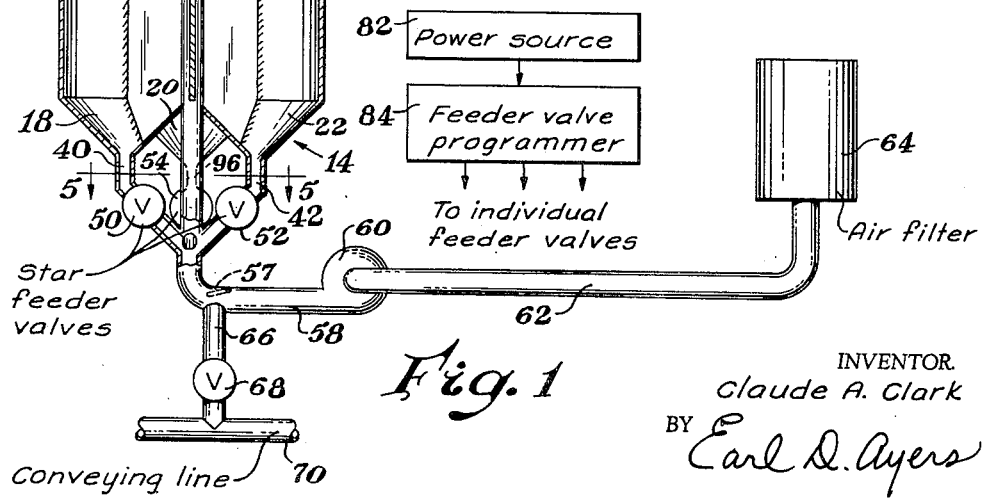

In the embodiment of dispersing element 30a shown in FIG. 4, the element 30a is disposed, by means of brackets 32a, in the same manner as is the element 30 shown in FIG. 1. The configuration of a diammetrical longitudinal cross section, however, is such that the lower part of the element does not have straight sides. Instead, the sides, as thus viewed, are curved concave inwardly slightly to assure that all particulate material blown from the upper end of the member 16 will be deflected towards the sides of the chamber and fall in a random manner into one of the compartments.

In one blender made in accordance with this invention the chamber is 44 feet 6 inches high, exclusive of the hoppers, and is 10 feet in diameter. The partitions 24, 26, 28 extend to within 6 feet of the top of the chamber, the pipe-like member 16 extending 2 feet above the partitions. The member 16 has an inside diameter of about 1 foot. The diameter of the dispersing element 30 is about 4 feet.

With a conventional standard squirrel cage blower drive by a 15 horsepower motor, coupled to the line 58, 100,000 pounds of polyethylene pellets were thoroughly blended in less than three hours. The ease with which blending is accomplished using a blower of relatively small capacity is attributed to the fact that the pipelike member 16 is of relatively large diameter (reducing friction losses) and because the member 16 is symmetrically in the chamber and provides a short return or recirculating path for the particulated materials being blended.

It has been found that blending occurs as the material enters the pipe 16 just above the constricted part 57 and in the riser or pipe-like member 16 as well as when the particulated material impinges on the dispersing element. It is desirable that the particulated materials being blended be approximately of the same size and mass in order to more easily achieve a good blend.

It is obvious that the blending apparatus of this invention may be used in combination with closed system air or inert gas recirculation if such is desirable for a particular application. Automatic controlling of the timing and flow rates of the star feeder valves 50, 52, 54 and of the output of the blower is also contemplated.

Automatic control of the timing and flow-through rates of the star feeder valves 50, 52, 54 (the valves are assumed to include their individual drive motors) may be as shown in connection with FIG. 1 wherein a power source 82 for energizing the drive means for the feeder valves (50, 52, 54) is coupled to a feeder valve programmer 84 which may include a timer and/or speed control means for varying the speed of the drive motors for the feeder valves. Such an arrangement for varying the rates at which individual feeder valves at any one moment meter product from each compartment (while maintaining a constant hourly feed rate, for example) assists in breaking up any stratification which exists in the product contained in the individual compartments. In addition, if the programmer 84 includes a speed control, the feed rates of the feeder valves may be adjusted, the metering rates of the feeder valves may be adjusted to provide proportional feeding of the products in the compartments. Proportional feeding is often useful for the first pass through the blending apparatus where the compartments are not equally filled with product.

Figure 5:
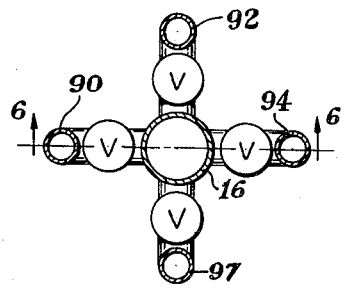

FIGS. 5 and 6 illustrate an alternative embodiment of blending apparatus in accordance with this invention. For the purpose of simplicity in the drawing the apparatus appears as though the conduits 90, 92, 94 extending from the feeder valves 50, 52, 54 approach the central conduit 16 at a 90 degree angle with respect to each other. A fourth conduit 97, which may be the means through which an additive material, for example, is fed into the conduit 16 for mixing and blending with the particulate material in the compartments of the storage chamber.

While the apparatus as heretofore described gives an excellent performance as a blender, the amount of blending of the particulate material which takes place in the riser tube 16 can, at least in some instances, be increased. This increase is achieved by inserting one or more venturi-like constrictions 96 in the riser pipe 16 above the point of entry of the particulate material into the riser tube.

The increased blending is achieved at the cost of additional power due to the required increase in capacity of the blower 10 when such constrictions are used. The increased blending efficiency is a greater advantage in many instances than the disadvantage of a slight increase in power costs to operate the blender.

It should be remembered that any constriction in the riser pipe should have a configuration such that it is self-cleaning during operation. Otherwise, contamination of the materials passing through the blender would occur.

Particulate materials of several size ranges have been blended in apparatus made in accordance with this invention. The size of the particles may vary from powder, sand granules from fine to coarse size, to pellets which are a quarter of an inch or more in their longest dimension, for example. Actually, the practical limitation on pellet or grain size which can be so blended, for example, is the particle weight which the pressurized air can carry up the vertically inclined member 16 and cause to impinge on the dispersing element before being deflected into the open topped compartments of the chamber.

While both a filtered exhaust and a vent are shown in the top of the chamber in FIG. 1, only one vent of adequate capacity is actually required in operating the blender.

What is claimed is:

1. Blending apparatus comprising a hollow chamber having side walls, an upper end, a lower end, a longitudinal axis, and a plurality of compartments therein, said compartments being separated one from another by a plurality of partitions, said partitions being generally parallel with the longitudinal axis of said chamber, the partitions extending from the lower end of said chamber a substantial part of the way to said upper end, each of said compartments having a hopper communicating with the lower part, a hollow riser member, said riser member being disposed generally parallel with and along the longitudinal axis of said chamber and extending through the lower end of said chamber and also at least nearly to the upper end part of said partitions, a plurality of discharge lines, each of said discharge lines having a star feeder type valve coupled across it, one of said discharge lines being coupled between each of said hoppers and said riser pipe at a point below said hoppers, valved conduit means for sequentially applying gas under pressure into the part of said riser member which is below where the discharge lines are coupled to it in one direction and for withdrawing material from said chamber through the part of said riser member which lies below where the discharge lines enter it, means for feeding particulated materials into said compartments from the upper end of said chamber, and means for randomly dispersing into said compartments particulated materials which are blown from said riser pipe as gas is applied under pressure to said constricted part.

2. Apparatus in accordance with claim 1, wherein said compartments are substantially equal in size.

3. Apparatus in accordance with claim 1, wherein said partitions each extend between said riser member and a wall part of said chamber.

4. Apparatus in accordance with claim 1, wherein at least one constriction is disposed in the part of said riser member which is above where the discharge lines join the riser member.

5. Apparatus in accordance with claim 4, wherein said constriction is a venturi element.

6. Apparatus in accordance with claim 1, wherein said upper end of said chamber is closed and has at least one vent therein.

7. Apparatus in accordance with claim 1, wherein said means for applying gas under pressure includes a blower.

8. Apparatus in accordance with claim 1, wherein said means for randomly dispersing particulated materials blown from said riser pipe comprises a generally conical surface of substantially wider diameter than said riser member, said surface being disposed in spaced apart axially aligned relationship with respect to said riser member.

9. Apparatus in accordance with claim 1, wherein said riser member has a diameter which is about $\frac{1}{10}$th the diameter of the chamber, said chamber being cylindrical along a major part of its length.

10. Apparatus in accordance with claim 1, wherein the means for feeding particulated materials into said compartments comprises a separate feed line directed into each compartment.

11. Apparatus in accordance with claim 1, wherein there are three compartments.

12. Apparatus in accordance with claim 1, wherein said means for feeding particulated materials into said compartments comprises an axially disposed feed line at said upper end directed at a dispersing member.

13. Apparatus in accordance with claim 1, wherein the coupling of the discharge lines to the riser member is symmetrical with respect to a plane perpendicular to the longitudinal axis of said chamber.

14. Apparatus in accordance with claim 1, wherein the number of discharge lines is one greater than the number of hoppers, the additional discharge line being adapted to be coupled to an external reservoir which is separate from said chamber.

15. Apparatus in accordance with claim 1, wherein means is provided for operating said star type feeders on a time and rate programmed basis.

References Cited in the file of this patent

UNITED STATES PATENTS 923,571    Paterson _____ June 1, 1909

FOREIGN PATENTS 523,717    Belgium _____ Nov. 14, 1953
553,024    Italy _____ Dec. 17, 1956